US012766052B2

(12) United States Patent
Vuorenoja

(10) Patent No.: US 12,766,052 B2
(45) Date of Patent: Oct. 20, 2026

(54) FOLDABLE STRETCHER WITH WHEELS

(71) Applicant: FRESTEMS OY, Sastamala (FI)

(72) Inventor: Ari-Matti Vuorenoja, Sastamala (FI)

(73) Assignee: FRESTEMS OY, Sastamala (FI)

( * ) Notice: Subject to any disclaimer, the term of this patent is extended or adjusted under 35 U.S.C. 154(b) by 8 days.

(21) Appl. No.: 18/866,882

(22) PCT Filed: May 15, 2023

(86) PCT No.: PCT/FI2023/050270

§ 371 (c)(1),
(2) Date: Nov. 18, 2024

(87) PCT Pub. No.: WO2023/222947

PCT Pub. Date: Nov. 23, 2023

(65) Prior Publication Data

US 2025/0241805 A1 Jul. 31, 2025

(30) Foreign Application Priority Data

May 20, 2022 (FI) ..................................... 20225444

(51) Int. Cl.

*A61G 1/013* (2006.01)
*A61G 1/02* (2006.01)
*A61G 1/048* (2006.01)

(52) U.S. Cl.

CPC ............... *A61G 1/013* (2013.01); *A61G 1/02* (2013.01); *A61G 1/048* (2013.01)

(58) Field of Classification Search

CPC .......... A61G 1/013; A61G 1/02; A61G 1/048; A61G 1/0212; A61G 1/01; A61G 1/0231; A61G 1/056

See application file for complete search history.

(56) References Cited

U.S. PATENT DOCUMENTS 314,185 A * 3/1885 Knowlton ................. B62B 1/20 280/47.18
2,362,721 A * 11/1944 Reynolds ............... A61G 1/013 280/654

(Continued)

FOREIGN PATENT DOCUMENTS

AU 2015232943 B2 8/2020
CN 2928070 Y 8/2007

(Continued)

OTHER PUBLICATIONS

Finnish Search Report for FI 20225444, dated Oct. 26, 2022, 2 pages.

(Continued)

*Primary Examiner* — Myles A Throop
(74) *Attorney, Agent, or Firm* — Nixon & Vanderhye PC

(57) ABSTRACT

A foldable stretcher (100) with wheels, the stretcher comprising a base frame (110) comprising a first end (112) and a second end (114), first handles (120) attached to the base frame, a foldable frame (130), comprising a first end (132) and a second end (134), the first end being arranged in an articulated manner in connection with the second end of the base frame, whereby the foldable frame is able to be in a straight position and an angled position relative to the base frame, a patient bed (600) attached to the base frame, and wheels (140) on outer sides of the foldable frame, each wheel comprising a central axle (142) at a distance less than a radius of the wheel from the second end of the foldable frame, and wherein the highest point of the wheel is above of the patient bed in the straight position of the foldable frame.

13 Claims, 5 Drawing Sheets

(56) References Cited

U.S. PATENT DOCUMENTS

| | | | | | |
|---|---|---|---|---|---|
| 3,073,614 | A * | 1/1963 | Zinneman | B62B 1/12 | 280/30 |
| 4,376,547 | A * | 3/1983 | Dominko | A47C 13/00 | 280/654 |
| 4,659,142 | A * | 4/1987 | Kuchinsky, Jr. | B62B 1/12 | 297/118 |
| 5,356,197 | A * | 10/1994 | Simic | A47C 17/70 | 280/204 |
| 5,572,756 | A * | 11/1996 | Muuranen | A61G 1/0262 | 5/625 |
| 6,283,496 | B1 * | 9/2001 | Dickmann | B62B 1/208 | 280/655 |
| 6,375,200 | B1 * | 4/2002 | Harter | B62B 1/12 | 297/16.2 |
| 6,685,198 | B1 * | 2/2004 | Hartman | B62B 5/06 | 280/47.24 |
| 8,087,112 | B2 * | 1/2012 | Cahaan | A61G 1/013 | 280/47.25 |
| 8,789,730 | B2 * | 7/2014 | Mroczka | A45F 3/04 | 224/160 |
| 2002/0056162 | A1 * | 5/2002 | Flynn | A61G 1/0212 | 5/617 |
| 2004/0183264 | A1 * | 9/2004 | Agee | B62B 1/208 | 280/47.3 |
| 2012/0007340 | A1 * | 1/2012 | Bar Noy | A61G 1/042 | 280/640 |
| 2014/0232129 | A1 | 8/2014 | Mroczka | | |

FOREIGN PATENT DOCUMENTS

| | | | | |
|---|---|---|---|---|
| CN | 101803981 | A | 8/2010 | |
| CN | 205268412 | U | 6/2016 | |
| CN | 111481354 | A | 8/2020 | |
| CN | 114587803 | A | 6/2022 | |
| EP | 0773773 | B1 | 10/2000 | |
| JP | 2000-060901 | | 2/2000 | |
| JP | 3112301 | | 8/2005 | |
| JP | 2015-139607 | | 8/2015 | |
| JP | 2015139607 | A * | 8/2015 | |
| KR | 20130025196 | A | 3/2013 | |
| WO | WO-9412137 | A1 * | 6/1994 | A61G 1/0262 |

OTHER PUBLICATIONS

International Search Report and Written Opinion of the ISA for PCT/FI2023/050270, mailed Jul. 28, 2023, 11 pages.

Sep. 25, 2025 Office Action issued in Japanese Patent Application No. 2025-514874, pp. 1-2 [English translation included].

* cited by examiner

FOLDABLE STRETCHER WITH WHEELS

CROSS-REFERENCE TO RELATED APPLICATIONS

This application is the U.S. national phase of International Application No. PCT/FI2023/050270 filed May 15, 2023, which designated the U.S. and claims priority to FI 20225444 filed May 20, 2022, the entire contents of each of which are hereby incorporated by reference.

FIELD OF THE INVENTION

The invention relates to a foldable stretcher with wheels for transportation of a patient.

BACKGROUND OF THE INVENTION

EP-publication No. 0773773 B1 discloses a stretcher for transportation of patients. The disclosed stretcher comprises wheels at an end of the stretcher. The stretcher is configured to be foldable in a straight position and an angled position of the stretcher. The stretcher may be pushed or pulled with the help of wheels by one person.

A drawback with the transportation of the patient may be limitations of performance in an uneven terrain. This may lead to situations where transportation of the patient cannot be done by one person.

BRIEF DESCRIPTION OF THE INVENTION

An object of the present invention is to provide a novel foldable stretcher with wheels.

The invention is characterized by the features of the independent claim.

The invention is based on the idea of a foldable stretcher comprising a base frame, a patient bed, first handles, a foldable frame and wheels coupled to the foldable frame. A location and size of the wheels are arranged so that they are suitable for operating also in an uneven terrain.

An advantage of the solution is a good performance also in uneven terrains.

Some embodiments of the invention are disclosed in the dependent claims.

BRIEF DESCRIPTION OF THE DRAWINGS

In the following the invention will be described in greater detail by means of preferred embodiments with reference to the accompanying drawings, in which.

For the sake of clarity, the figures show some embodiments of the invention in a simplified manner. Like reference numerals identify like elements in the figures.

DETAILED DESCRIPTION OF THE INVENTION

Figure 1:
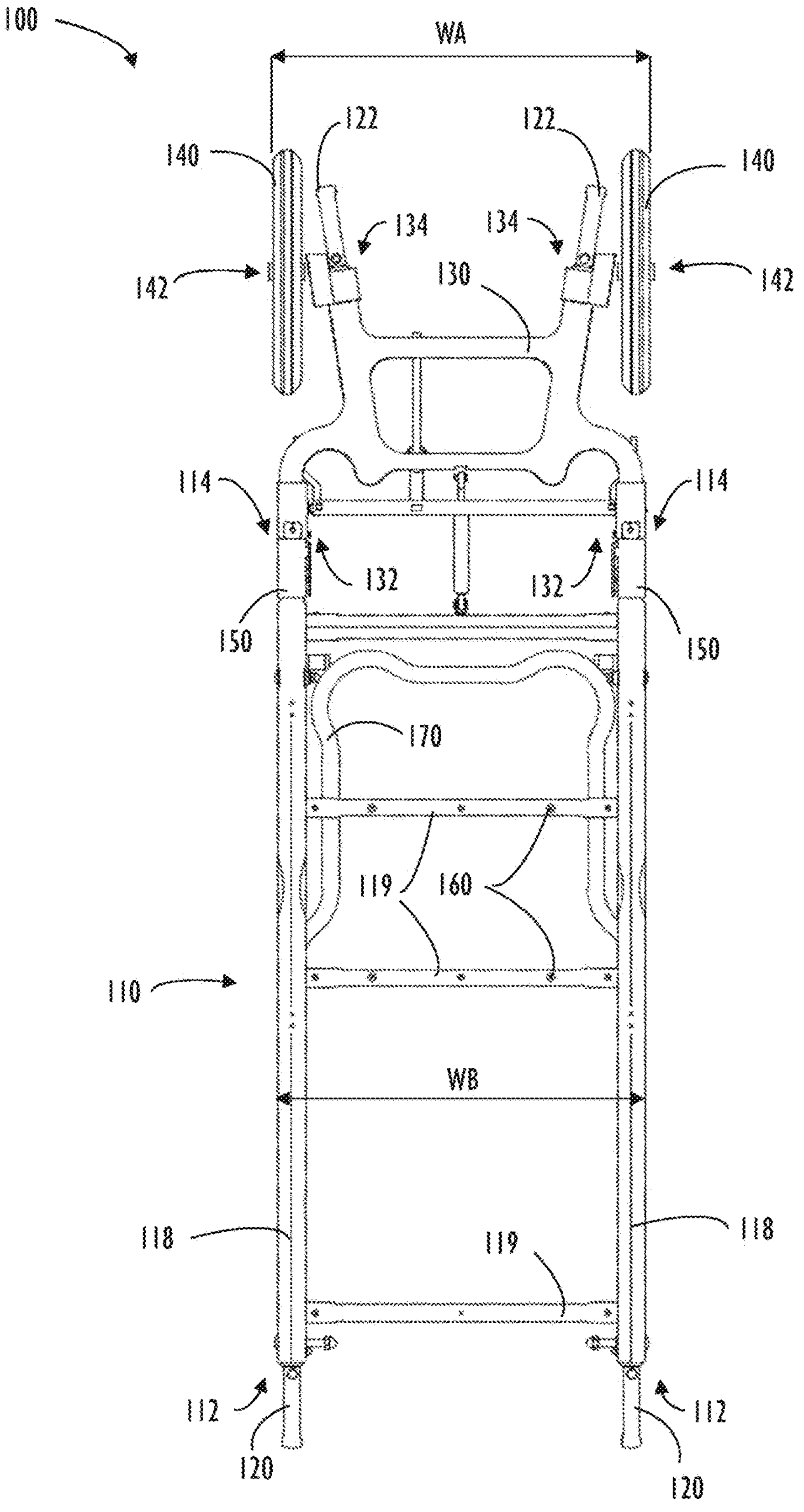
FIG. 1 shows schematically a foldable stretcher in a straight position as seen from above of the stretcher.
Figure 2:
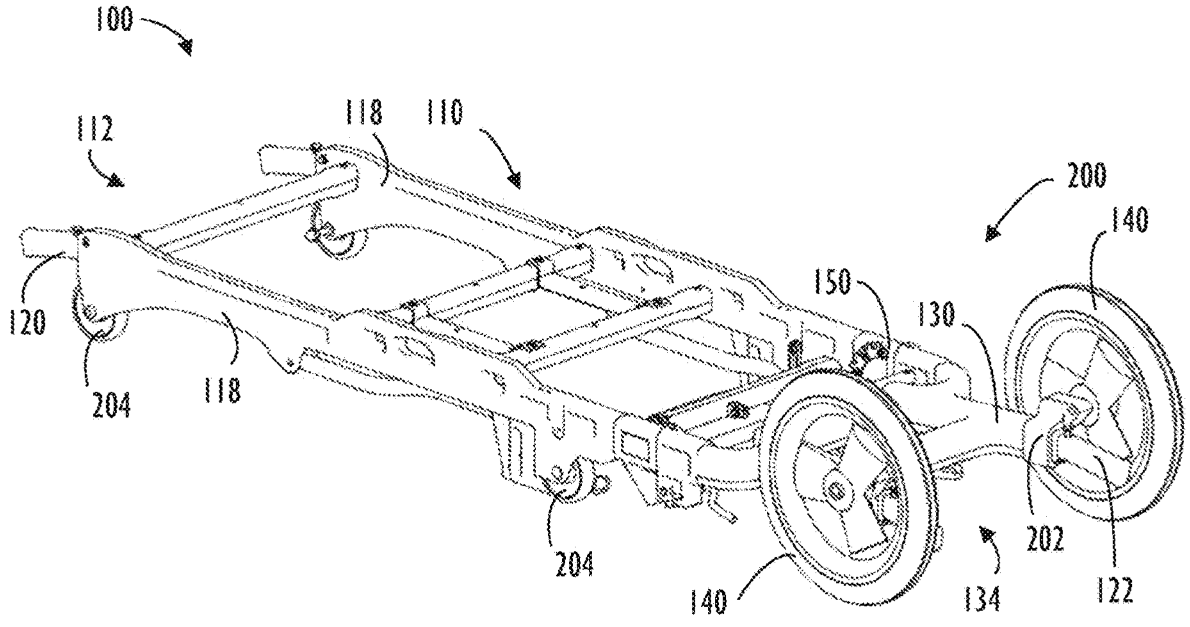
FIG. 2 shows schematically the stretcher of FIG. 1 in the straight position as seen obliquely from above of the stretcher.
Figure 3:
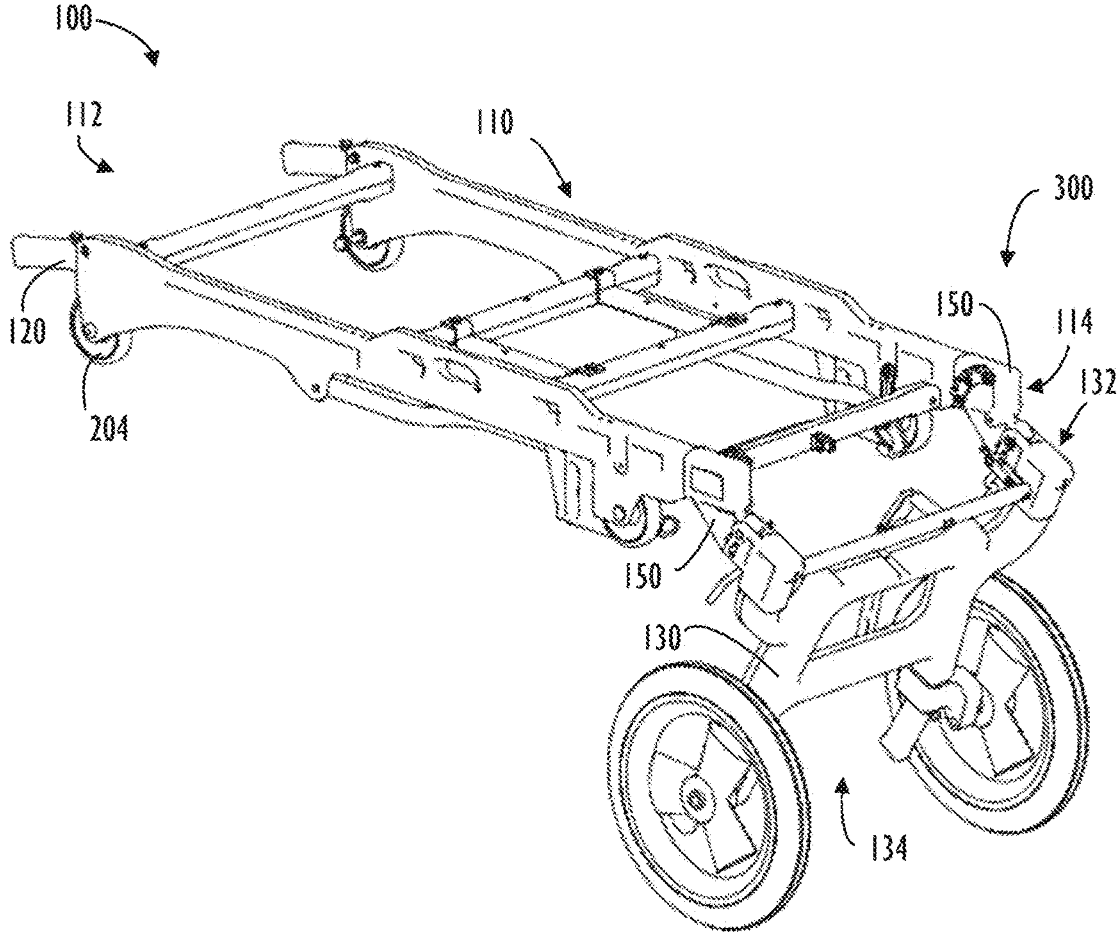
FIG. 3 shows schematically the stretcher of FIG. 1 in an angled position as seen obliquely from above of the stretcher.
Figure 4:
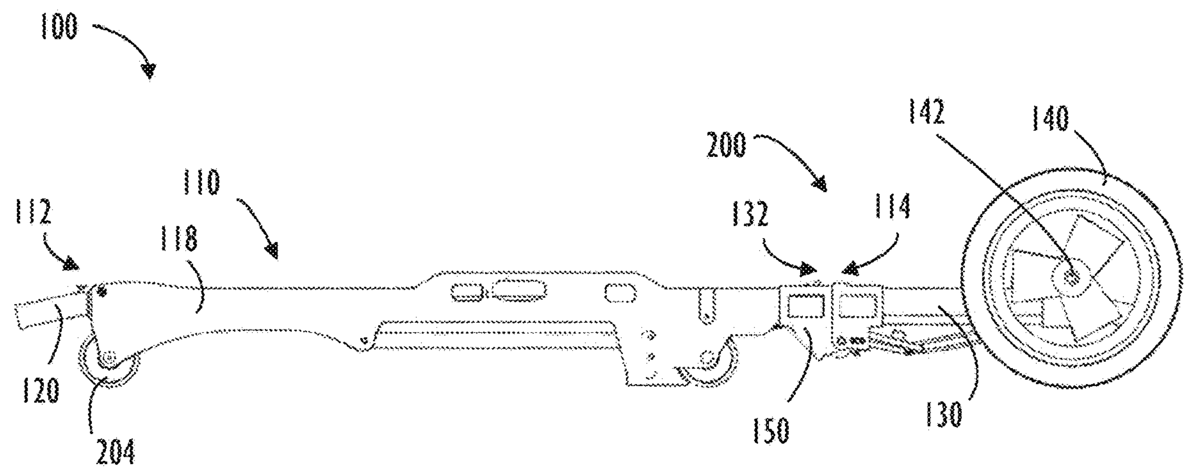
FIG. 4 shows schematically the stretcher of FIG. 1 in the straight position as seen from the side of the stretcher.
Figure 5:
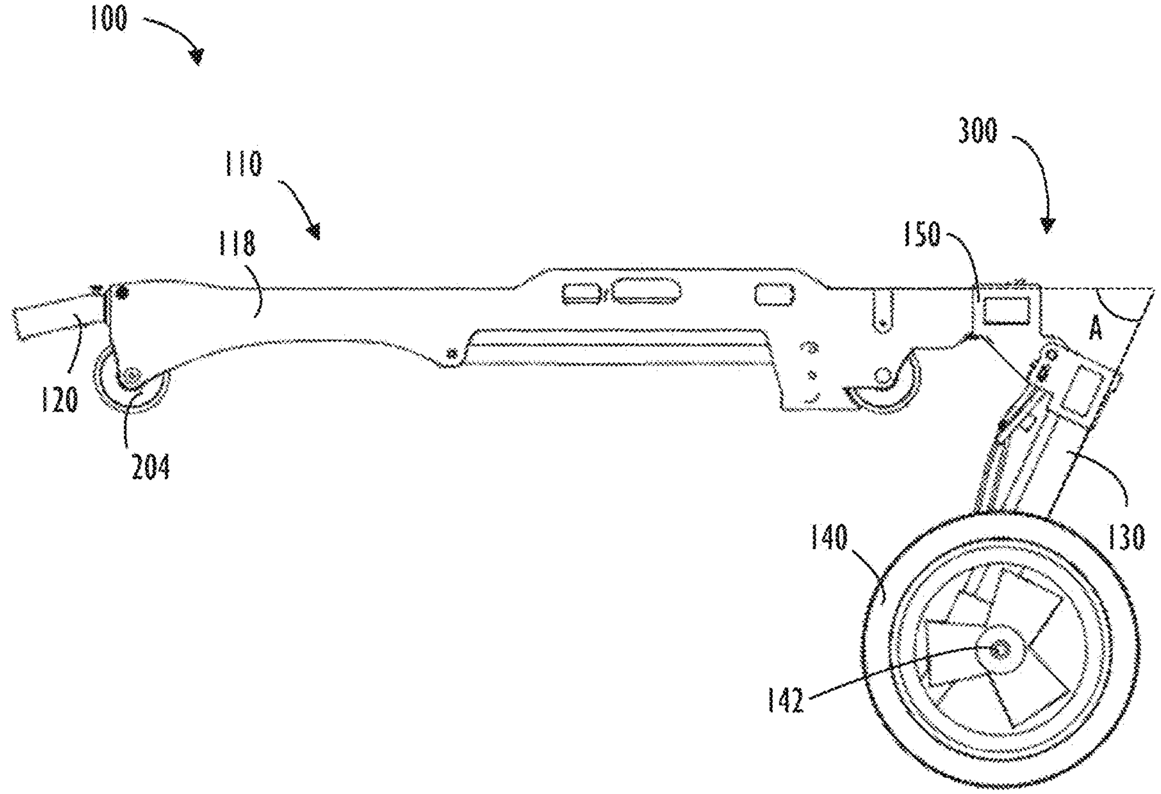
FIG. 5 shows schematically the stretcher of FIG. 1 in the angled position as seen from the side of the stretcher.
Figure 6:
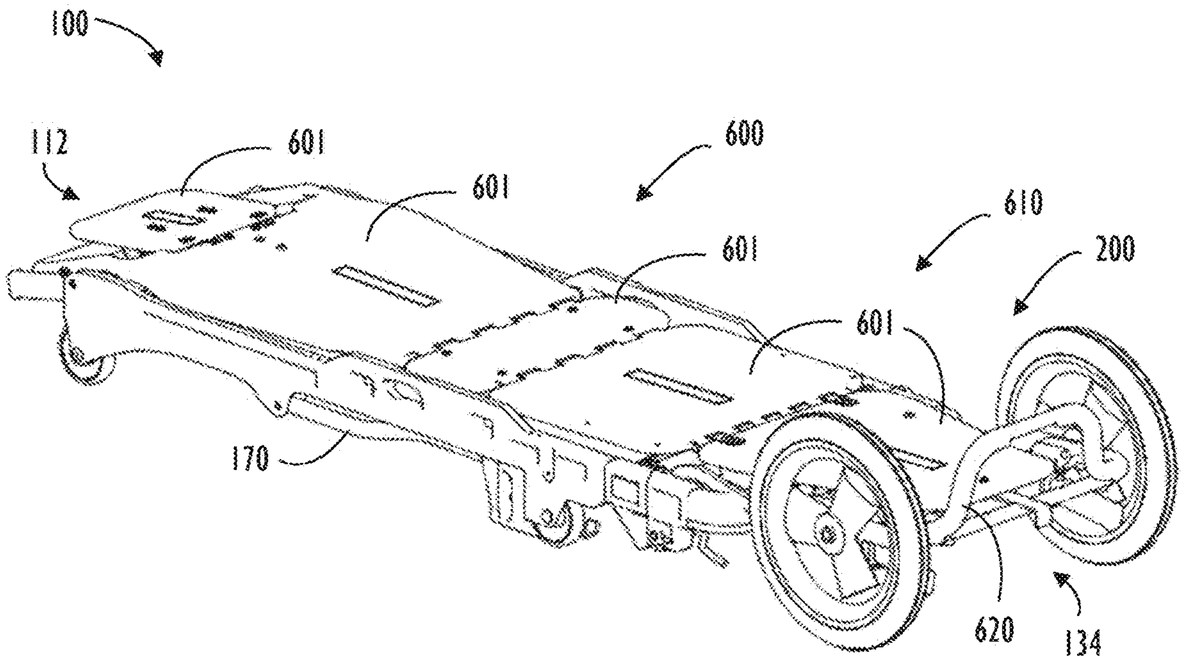
FIG. 6 shows schematically the stretcher of FIG. 1 in the straight position and equipped with a patient bed as seen obliquely from above of the stretcher.
Figure 7:
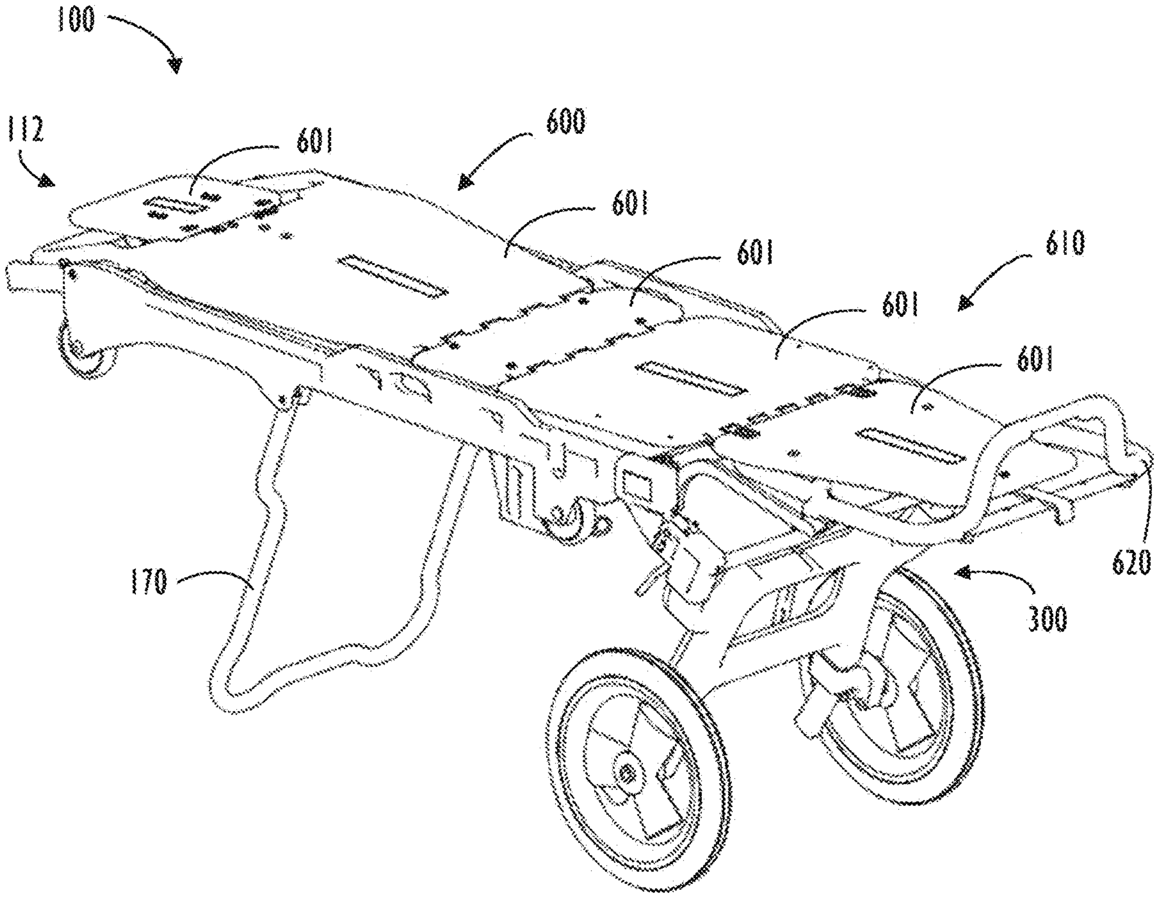
FIG. 7 shows schematically the stretcher of FIG. 6 in the angled position as seen obliquely from above of the stretcher.
Figure 8:
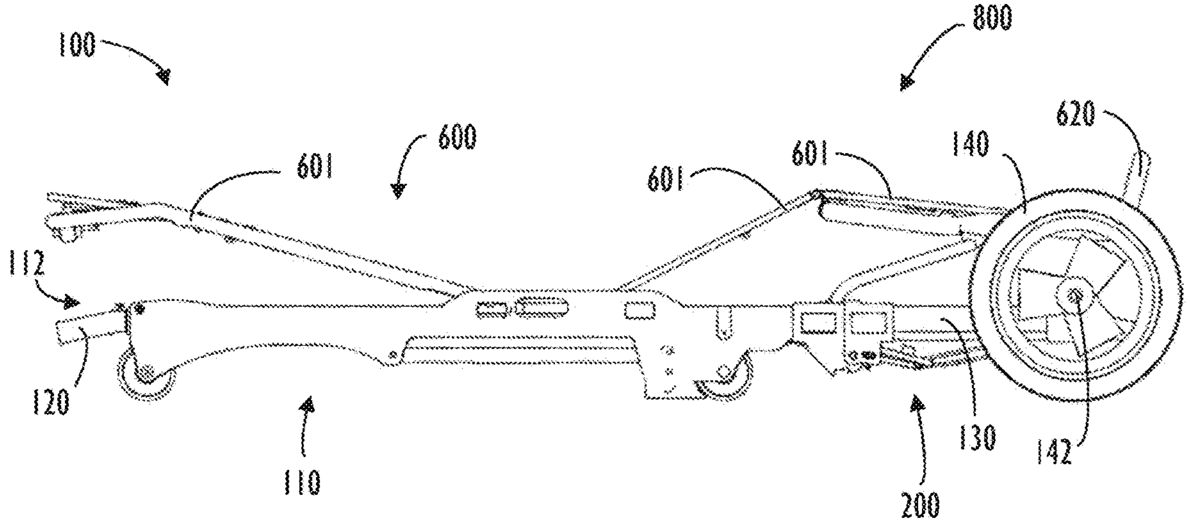
FIG. 8 shows schematically the stretcher of FIG. 6 in the straight position as seen obliquely from the side of the stretcher.

FIG. 1 shows schematically a foldable stretcher 100 with wheels in a straight position as seen from above of the stretcher. FIG. 2 shows schematically the stretcher 100 of FIG. 1 in the straight position as seen obliquely from above of the stretcher. FIG. 3 shows schematically the stretcher of FIG. 1 in an angled position as seen obliquely from above of the stretcher. FIG. 4 shows schematically the stretcher of FIG. 1 in the straight position as seen from the side of the stretcher. FIG. 5 shows schematically the stretcher of FIG. 1 in the angled position as seen from the side of the stretcher. FIG. 6 shows schematically the stretcher of FIG. 1 in the straight position with a patient bed as seen obliquely from above of the stretcher. FIG. 7 shows schematically the stretcher of FIG. 6 in the angled position as seen obliquely from above of the stretcher. FIG. 8 shows schematically the stretcher of FIG. 6 in the straight position as seen from the side of the stretcher.

In FIGS. 1, 2, 4, 6 and 8 the stretcher 100 is in the straight position 200. The stretcher 100 in the straight position 200 may be set substantially horizontally for example on a surface that is at a distance from the ground, wherein the stretcher may be pushed and/or pulled ergonomically while the stretcher being on the surface. Also, the stretcher in the straight position may be at an angle against the ground by the wheels 140, whereby the stretcher may be pushed and/or pulled ergonomically via first handles 120 of the stretcher at one end of the stretcher. According to an embodiment, the stretcher comprises handles at both ends of the stretcher so that the stretcher in the straight position may be carried by two persons.

In FIGS. 3, 5 and 7 the stretcher 100 is in the angled position 300. The stretcher 100 in the angled position 300 may be set for example onto the ground, whereby the stretcher may be pushed and/or pulled ergonomically via first handles 120 of the stretcher at one end of the stretcher. For the sake of clarity, the patient may be or lie straight on the patient bed 600 of the stretcher even though the stretcher is in the angled position 300.

Thus, the patient may be transported by the stretcher 100 being in the straight position 200 and in the angled position 300 of the stretcher 100.

The stretcher 100 of the Figures comprises a base frame 110. The base frame 110 comprises at least two longitudinal frame beams 118 and plurality of cross beams 119 between the longitudinal frame beams 118. A width WB of the base frame 110 is a distance between outer sides of the base frame 110 which is also known as a maximum width of the base frame 110. The base frame 110 comprises a first end 112 and a second end 114, the second end 114 of the base frame 110 locating opposite the said first end 112 in a longitudinal direction of the base frame 110, that is also a longitudinal direction of the stretcher 100. In suitable us-age, a head of the patient is intended to be near the first end 112 of the base frame 110. The base frame 110 may comprise or consist of carbon fibre for lightweight structure.

The stretcher 100 of the Figures comprises first handles 120 attached to the first end 112 of the base frame 110, at the respective ends of the frame beams 118. Each first handle 120 comprises a telescopic mechanism, or arm, configured to be locked in several positions. Each first handle 120 comprises a locking mechanism, such as a spring-loaded button, configured to lock the first handle in several positions and to release the first handle from several positions. Several positions of the first handles 120 may be needed for example for different kind of handling purposes. In Figures, the first handles 120 are parallel in the longitudinal direction of the stretcher 100. According to an embodiment, the first handles 120 may be at an angle relative to the longitudinal direction of the base frame 110 when viewed from above of the base frame 110.

The stretcher 100 of the Figures comprises a foldable frame 130. The foldable frame 130 comprises a first end 132 and a second end 134, the second end 134 of the foldable frame 130 locating opposite the said first end 132 in a longitudinal direction of the foldable frame 130. The first end 132 of the foldable frame 130 is arranged in an articulated manner, by an articulated part 150, in connection with the second end 114 of the base frame 110. The foldable frame 130 is able to be, relative to the base frame 110, in a straight position, i.e., substantially parallel to the base frame 110, that provides for the straight position 200 of the stretcher 100. The foldable frame 130 is also able to be, relative to the base frame 110, in an angled position, that provides the angled position 300 of the stretcher. The foldable frame 130 comprises a beam structure. The beam structure may comprise or consist of carbon fibre.

The foldable frame 130 of the Figures comprises two curved beams at the first end 132, wherein ends of the curved beams facing to the base frame 110 may be collinear with corresponding frame beams 118 at the second end 114 of the base frame 110. The connection between the first end 132 of the foldable frame 130 and the second end 114 of the base frame 110 comprises the articulated part 150 comprising a pivot around which the foldable frame 130 is configured to swivel or turn. The articulated part 150 also comprises a locking mechanism that locks the foldable frame 130 in the straight position and in the angled position, i.e., the locking mechanism locks the foldable frame 130 relative to the base frame 110. The said locking mechanism may be locked and released, for example by a handle or a spring-loaded button. Thus, the foldable frame 130 is configured to be locked in the straight position 200 of the stretcher 100 and in the angled position 300 of the stretcher.

The stretcher 100 of FIGS. 6, 7 and 8 comprises a patient bed 600 for receiving a patient, i.e., on which the patient is intended to be set. Said cross beams 119 of the base frame 110 comprises mounting holes 160, on which the patient bed 600 may be arranged by mounting elements, such as by screws for example. Thus, the patient bed 600 is arranged at a top of the base frame 110 for receiving a patient. The patient may be received on the patient bed 600 in the straight position and the angled position of the foldable frame 130. For the sake of clarity, the position of the foldable frame 130 may be changed without changing the position of the patient bed 600.

Furthermore, the patient bed 600 comprises plurality of sheets 601 made of carbon fibre, for example. The sheets 601 comprises joints around which adjacent sheets 601 may twist. The sheets 601 may be supported by supporting elements, such as lockable gas springs, for different kind of postures for the patient. The patient bed 600 comprises a first end locating near the first end 112 of the base frame 110, and the patient bed 600 comprises also a second end locating near the second end 134 of the foldable frame 130 in the straight position of the foldable frame 130, which maximizes an area for the patient in the longitudinal direction of the stretcher 100.

Furthermore, the patient bed 600 has at least a straight position 610 of the patient bed 600, i.e., the sheets 601 being substantially parallel to each other. Therefore, the patient is intended to lay on the patient bed 600 the patient being substantially straight in the straight position 610 of the patient bed 600 in the straight position and the angled position of the foldable frame 130. The straight position 610 of the patient bed 600 is seen in FIGS. 6 and 7.

Furthermore, the patient bed 600 may also have a folded position 800, i.e., at least one sheet 601 is at an angle relative to adjacent sheet, so that some 15 part(s) of the patient, such as legs of the patient, may be set at an angle relative to other part(s) of the patient, such as an upper body of the patient. Therefore, the patient is intended to be on the patient bed 600 in the folded position 800 of the patient bed 600 in the straight position and the angled position of the foldable frame 130. The folded position 800 of the patient bed 600 is seen in FIG. 8.

The stretcher 100 of the Figures comprises wheels 140, such as an air filled or airless tyres, on outer sides of the foldable frame 130. Each wheel 140 comprises a central axle 142, that is coupled to the foldable frame 130 and around which the wheel 140 rotates. The central axle 142 of the wheel 140 may comprise a bearing for a low friction. In the Figures the foldable frame 130 comprises a bracket 202, i.e., a mounting bracket, for each central axle 142 of the wheel 140 to be arranged to the foldable frame 130, wherein the bracket 202 sets the central axle 142 of the wheels 140 at a distance from the foldable frame 130 in a horizontal, vertical and width direction of the foldable frame 130.

Each central axle 142 is at a distance less than a radius of the wheel 140 from the second end 134 of the foldable frame 130 in the longitudinal direction of the foldable frame 130. Due to the wheels 140 locating near the second end 134 of the foldable frame 130, the wheels 140 do not limit an access to an upper body of the patient for first aid, and therefore for example, there is no need to remove the wheels 140 in intended usage, although the wheels 140 may be removable for example with a quick release.

Furthermore, the lowest point of each wheel 140 is configured to be below the foldable frame 130, when the foldable frame 130 is in the straight position. This ensures a contact between the wheels 140 and the ground for transportation of the stretcher 100 by the help of the wheels 140, when the stretcher 100 is pushed or pulled in the straight position 200 of the stretcher 100. Also, there is a short distance in vertical direction between the lowest point of the wheel 140 and the lowest point of the base frame 110 or the foldable frame 130, whereby a ground clearance of the stretcher 100 in the straight position is low. Due to the low ground clearance of the stretcher 100 in the straight position 200, the stretcher in the straight position 200 has also a low mass centre, which may reduce impacts subjected to the stretcher 100, for example in situations wherein the stretcher is in an ambulance that crashes. Also, said low ground clearance of the stretcher 100 in the straight position 200 provides a short distance, in vertical direction, from the lowest point of the stretcher 100 to an upper side of the patient bed 600 of the stretcher 100, on which the patient may lie. Therefore, there is an easy access for example by a paramedic or equivalent to the patient on the stretcher, even if the stretcher is set high for example on the table or equivalent in the ambulance.

Furthermore, the wheel 140 comprises an outer side and an inner side. Each wheel 140 is arranged on the outer side of the foldable frame 130 so that the inner side of the wheel 140 is towards the outer side of the foldable frame 130. The foldable frame 130 is narrowed between the wheels 140 compared with the base frame 110, so that a width WA of the stretcher 100 in between the outer sides of the wheels 140 of the foldable frame 130 is substantially same as a width WB of the stretcher 100 in between the outer sides of the base frame 110. A narrow space in the ambulance may set a maximum width or determined width for the stretcher, which is not allowed to be exceeded by the stretcher in the ambulance. For example, the width for the stretcher is 550+/−20 mm in accordance with the standard EN 1865-1.

In addition, when the wheels 140 are arranged on the outer sides of the foldable frame 130, there is more space between the wheels 140 for the patient bed 600 compared with a situation, wherein the said wheels are arranged on opposite sides, i.e., on an inner side, of the foldable frame 130. Due to the wheels 140 locating on the outer sides of the foldable frame 130, the patient bed 600 that is wide enough for the patient, is also able to be set between the wheels 140 without the patient bed 600 limiting the size of the wheel 140 in vertical direction, which size of the wheel is described in more detail below. Also, the achieved longer distance between the wheels 140 may improve stability of the stretcher 100 in the width direction thereof.

Furthermore, the highest point of each wheel 140 is above of the patient bed 600 in the straight position 610, or even in the folded position 800, of the patient bed 600 in the straight position of the foldable frame 130 viewed from the side of the stretcher 100, whereby the size of the wheel 140 is big enough to operate in an uneven terrain. When the foldable frame 130 is in the straight position or in the angled position, the stretcher 100 with the big sized wheels 140 helps the stretcher 100 to be transported in an uneven terrain, wherein there may be small rocks or even fallen trees, which may be hard to cross by small sized wheels of the stretcher. Also, in an uneven terrain there may be sand or grass, wherein the wheels may sink by small sized wheels of the stretcher. The size of the wheel may be between 250 mm and 500 mm, for example. Especially the size of the wheel may be between 300 mm and 420 mm.

The central axle 142 of the wheel 140 may be arranged, in a vertical direction, on or above of the foldable frame 130, when the foldable frame 130 is in the straight position. Herein, for the sake of clarity, the location of the central axle 142 is viewed in situation where the stretcher is set horizontally. The central axle 142 on the foldable frame 130 means that the central axle 142 is against an upper side, i.e., the beam structure, of the foldable frame 130 when in the straight position. The central axle 142 above the foldable frame 130 means that the central axle 142 is at a distance above from the upper side, i.e., the beam structure, of the foldable frame 130 when in the straight position. The said location of the central axle 142 of the wheel 140 may be the location that provides the stretcher 100 to be set horizontally in the straight position of the stretcher 100 when using the big sized wheels 140.

In FIG. 5 the stretcher 100 is in the angled position 300 as seen from the side of the stretcher 100. An angle A between the longitudinal direction of the base frame 110 and the longitudinal direction of the foldable frame 130 is configured to be less than 90 degrees in the angled position 300 of the stretcher 100. When the angle A is less than 90 degrees, the central axle 142 of the wheel 140 is between the foldable frame 130 and the lowest point of the wheel 140. Said location of the central axle 142 of the foldable frame 130 increases the distance between the ground and the base frame 110 compared with a situation, wherein the central axle 142 locates on an opposite side of the foldable frame 130. It may therefore enable to use a shorter foldable frame 130, which may reduce the weight of the stretcher, and/or which may reduce the length of the stretcher when in the straight position. For the sake of clarity, when the stretcher is in the straight position 200, the angle A between the base frame 110 and the foldable frame 130 is substantially 180 degrees.

As mentioned above, the central axle 142 of the wheel 140 may be arranged, in a vertical direction, on or above of the foldable frame 130, when the foldable frame 130 is in the straight position. The central axle 142 of the wheel 140 may locate also or alternatively, in the vertical direction, on or above the base frame 110, i.e., frame beams 118 of the base frame 110, when the foldable frame 130 is in the straight position.

The stretcher 100 of the Figures comprises second handles 122 attached to the foldable frame 130. The second handles 122 are between the wheels 140. Each second handle 122 is arranged at the end of the beam structure of the second end 134 of the foldable frame 130 so that the straight position 610 of the patient bed 600 may be used. Each second handle 122 comprises a telescopic mechanism, or arm, configured to be locked in several positions. Each second handle 122 comprises a locking mechanism, such as a spring-loaded button, configured to lock the second handle 122 in several positions and to release the second handle 122 from several positions. The second handles 122 are at an angle relative to the longitudinal direction of the foldable frame 130 as viewed from above of the foldable frame 130, i.e., each second handle 122 is set at an angle relative to a vertical middle plane of the longitudinal direction of the stretcher 100 in the straight position of the stretcher 100. Each second handle 122 is configured to be located between the wheels 140 when retracted, so that the second handles 122 may not be in contact to the ground when the stretcher 100 is in the angled position. Each second handle 122 may be extended at least partly in front of the wheel 140. When the second handles 122 are in front of the wheels, the distance between the second handles 122 may be substantially same as the distance between the first handles 120, which serves ergonomic purposes when the stretcher 100 is being carried by two persons. When the second handles 122 are retracted, the second handles 122 does not increase the length of the stretcher 100.

According to an embodiment, the stretcher 100 comprises a curved beam 620 at an end of the patient bed 600, wherein legs of the patient is intended to be located, the curved beam 620 replacing the second handles 122. The curved beam 620 is arranged in an articulated manner in connection with the second end 114 of the base frame 110. The patient bed 600 may be against an upper side of the curved beam 620, whereby the curved beam 620 supports the patient bed 600.

The base frame 110 of the Figures comprises plurality of rolls 204 attached to the underneath of the base frame 110 to help the stretcher 100 being pushed and/or pulled in the straight position 200 of the stretcher. The plurality of rolls 204 may be seen for example in FIG. 2. The rolls 204 of the base frame 110, and the wheels 140 of the foldable frame 130 as mentioned above, are aligned so that the stretcher 100 may be set horizontally when in the straight position 200 of the stretcher 100. The stretcher 100 set horizontally may provide the patient being also horizontally on the stretcher.

According to an embodiment, the stretcher 100 comprises a mounting element whereof the stretcher 100 is configured to be locked onto an underframe in the ambulance.

According to an embodiment, the stretcher 100 comprises a standing support 170, which may be a swivelling bended metal rod configured to be in a vertical position and in a horizontal position. The standing support 170 may be set into the vertical position as a support to hold the stretcher upright when it is not being pushed or pulled. The horizontal position of the standing support 170 is shown for example in FIG. 6, and the vertical position of the standing support 170 is shown for example in FIG. 7. The standing support 170 is arranged to the base frame 110 comprising a swivel point around which the standing support is configured to be swivelled. The base frame 110 comprises a locking part wherein the standing support is configured to be locked in and released, when the standing support 170 is in the horizontal position.

It will be obvious to a person skilled in the art that, as the technology advances, the inventive concept can be implemented in various ways. The invention and its embodiments are not limited to the examples described above but may vary within the scope of the claims.

The invention claimed is:

1. A foldable stretcher with wheels, the stretcher comprising:

a base frame comprising a first end and a second end, first handles at one end of the stretcher, a foldable frame, comprising a first end and a second end, the first end being arranged in an articulated manner in connection with the second end of the base frame, whereby the foldable frame is able to be in a straight position and an angled position relative to the base frame, the foldable frame further comprising a bracket for each central axle of a wheel to be arranged to the foldable frame, a patient bed attached to the base frame for receiving a patient in the straight position and the angled position of the foldable frame, and wheels on outer sides of the foldable frame, each wheel comprising a central axle at a distance less than a radius of the wheel from the second end of the foldable frame, wherein the highest point of the wheel is above of the patient bed in the straight position of the foldable frame, and wherein the central axle of the wheel is arranged on or above the foldable frame, when the foldable frame is in the straight position.

2. The foldable stretcher according to claim 1, wherein the stretcher comprises second handles attached to the foldable frame between the wheels.

3. The foldable stretcher as claimed in claim 2, wherein each second handle is set at an angle relative to a longitudinal direction of the foldable frame as viewed from above of the foldable frame.

4. The foldable stretcher as claimed in claim 2, wherein each second handle comprises a telescopic mechanism, and each second handle is configured to be located between the wheels when retracted.

5. The foldable stretcher as claimed in claim 4, wherein the telescopic mechanism is configured so that each second handle extends at least partly in front of the wheel when extended.

6. The foldable stretcher as claimed in claim 1, wherein the foldable frame is narrowed between the wheels compared with the base frame so that a width of the stretcher between the outer sides of the wheels of the foldable frame is substantially same as a width of the stretcher between outer sides of the base frame.

7. The foldable stretcher as claimed in claim 1, wherein the central axle of the wheel is arranged, in a vertical direction, on or above the base frame when the foldable frame is in the straight position.

8. The foldable stretcher as claimed in claim 1, wherein an angle between the base frame and the foldable frame is configured to be less than 90 degrees when the foldable frame is in the angled position, whereby the central axle of the wheel is between the foldable frame and the lowest point of the wheel.

9. The foldable stretcher as claimed in claim 1, wherein the connection between the first end of the foldable frame and the second end of the base frame comprises an articulated part comprising a pivot around which the foldable frame turns.

10. The foldable stretcher as claimed in claim 9, wherein the articulated part comprises a locking mechanism, locked and released by a handle or a spring-loaded button, configured to lock the foldable frame in the straight position and in the angled position.

11. The foldable stretcher as claimed in claim 1, wherein the stretcher, when the foldable frame is in the straight position, there is a distance in the vertical direction between the lowest point of the wheel and the lowest point of the foldable frame to provide ground clearance.

12. The foldable stretcher as claimed in claim 1, wherein the central axle is attached above of the foldable frame.

13. The foldable stretcher as claimed in claim 1, wherein the patient bed has a straight position, and the highest point of the wheel is above of the patient bed in the straight position of the patient bed in the straight position of the foldable frame.

* * * * *